United States Patent [19]

Price et al.

[11] Patent Number: 4,850,115
[45] Date of Patent: Jul. 25, 1989

[54] TOOL FOR POSITIONING ELECTRICAL OUTLET AND JUNCTION BOXES

[75] Inventors: Ronald N. Price, Show Low; Kevin S. Price, Scottsdale, both of Ariz.

[73] Assignee: FBN Enterprises, Show Low, Ariz.

[21] Appl. No.: 205,855

[22] Filed: Jun. 13, 1988

[51] Int. Cl.⁴ .................... B25B 11/00; B23Q 3/00
[52] U.S. Cl. ........................ 33/528; 33/DIG. 10; 269/41; 269/254 R; 269/904
[58] Field of Search ............... 33/DIG. 10, 528; 269/41, 254 R, 904

[56] References Cited

U.S. PATENT DOCUMENTS

| | | | |
|---|---|---|---|
| 1,774,934 | 9/1930 | Mangin | 220/3.92 |
| 1,814,449 | 7/1931 | Morgenstern | 220/3.9 |
| 2,032,636 | 3/1936 | Seckinger | 247/21 |
| 2,328,421 | 8/1943 | Carlson et al. | 248/300 |
| 2,919,913 | 1/1960 | Phair | 33/DIG. 10 |
| 2,956,798 | 10/1960 | Briggs | 269/904 |
| 2,962,281 | 11/1960 | Hodgson | 269/904 |
| 2,990,172 | 6/1961 | Gianotta | 33/DIG. 10 |
| 3,360,151 | 12/1967 | Yznaga | 220/3.9 |
| 3,474,994 | 10/1969 | Swanquist | 248/205 |
| 3,528,636 | 9/1970 | Schmidt | 248/205 |
| 3,606,223 | 9/1971 | Havener | 248/205 |
| 3,684,230 | 8/1972 | Swanquist | 248/229 |
| 3,875,669 | 4/1975 | Hull | 33/528 |
| 3,954,717 | 5/1976 | Tarr | 33/DIG. 10 |
| 4,135,337 | 1/1979 | Medlin | 52/221 |
| 4,140,293 | 2/1979 | Hansen | 248/217.2 |
| 4,403,708 | 9/1983 | Smolik | 220/3.5 |
| 4,645,089 | 2/1987 | Horsley | 220/3.6 |
| 4,750,271 | 6/1988 | Ericksen | 33/DIG. 10 |

Primary Examiner—William A. Cuchlinski, Jr.
Assistant Examiner—Diego F. F. Gutierrez
Attorney, Agent, or Firm—LaValle D. Ptak

[57] ABSTRACT

A tool for facilitating the height and depth placement of electrical outlet and junction boxes during rough construction comprises an elongated extruded support member having a rectangular or square cross-section and approximately five feet long. The rear surface is a plane for placement against the front surface of a stud on which electrical outlet boxes are to be placed. The front surface has a slot in it and box locator devices are slideably attached in the slot, so that the vertical height of electrical boxes to be attached to the stud is established by an initial adjustment of the box locator devices. Each box locator device further includes a box spacer extending on the sides of the support member ot establish the depth to which the box is located on the stud; and a spring is used to releasably hold the box in place against the spacer. The tool then is placed against the stud, the box is nailed or otherwise secured to the stud; and the tool is pulled away, leaving the box in place at the proper height and extending outwardly from the stud to the pre-established distance of the finish wall, which is added subsequently.

20 Claims, 2 Drawing Sheets

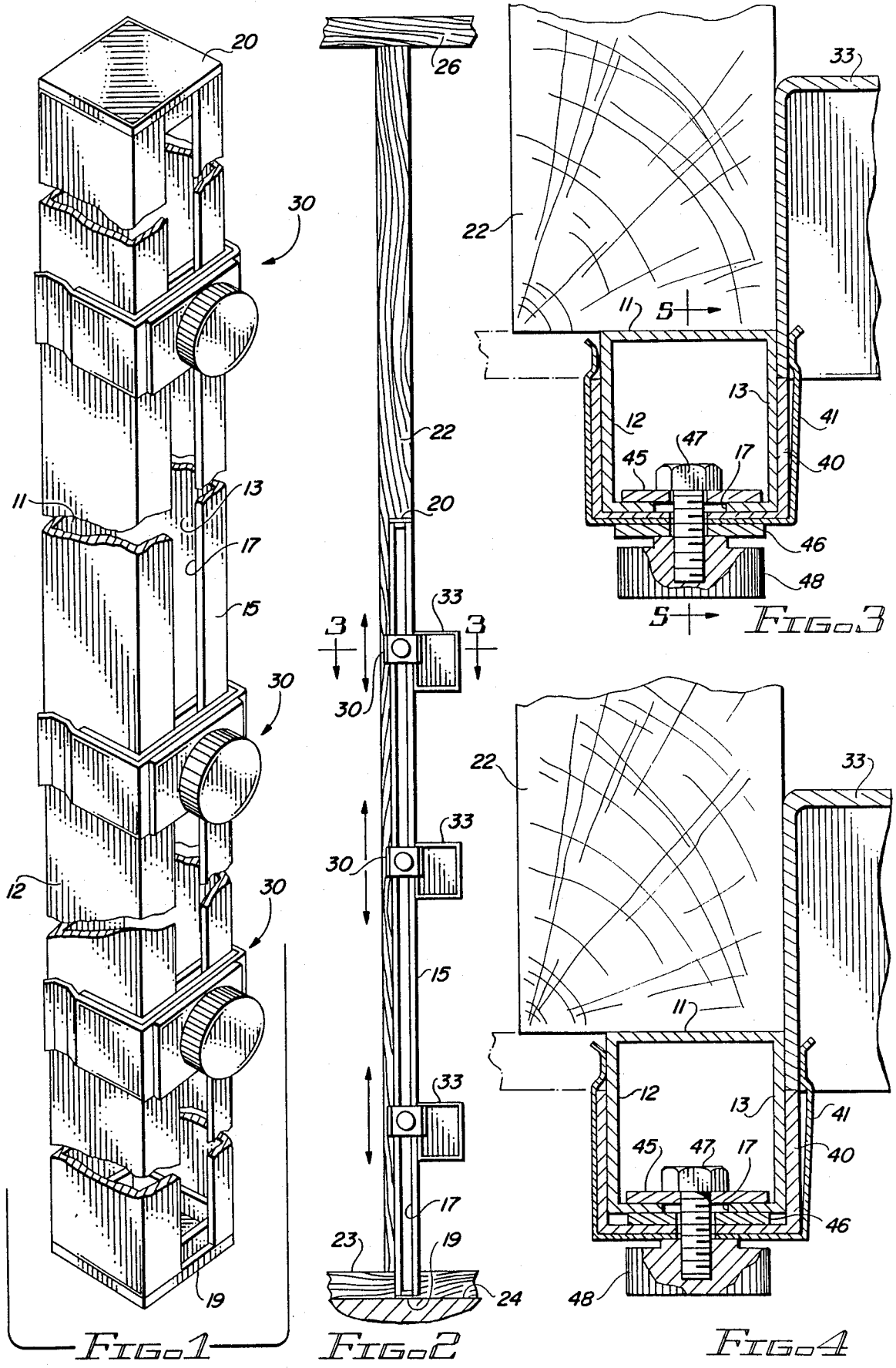

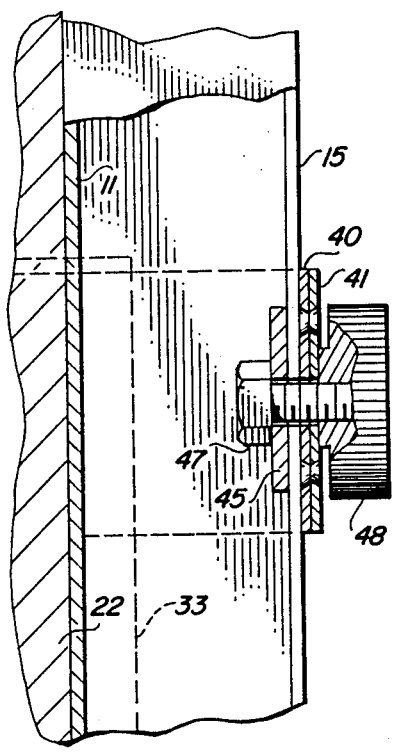
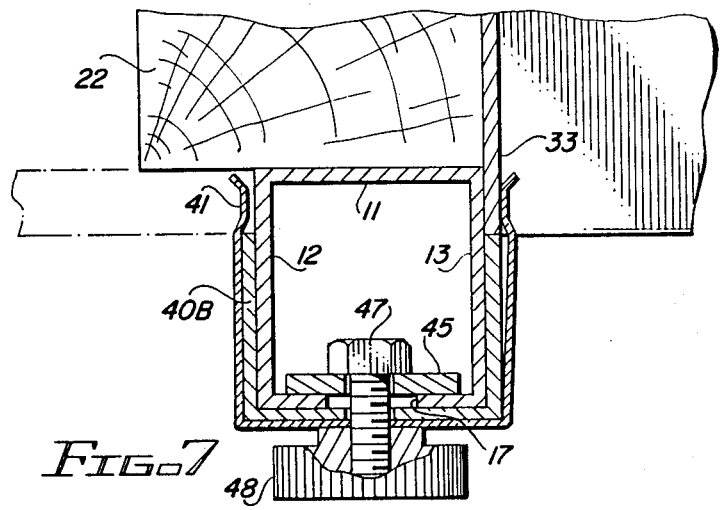
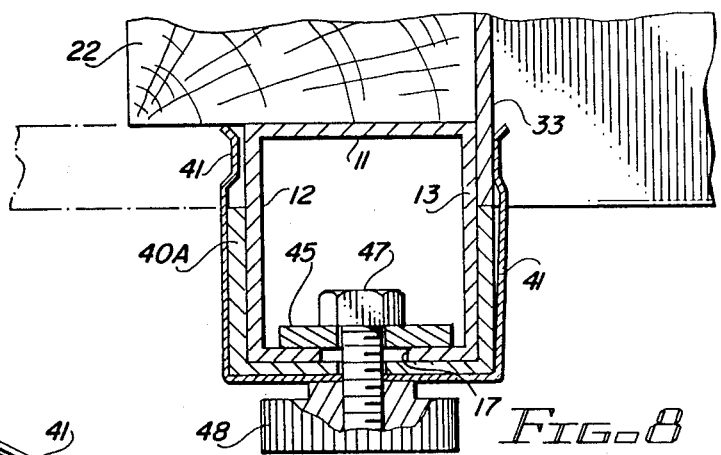
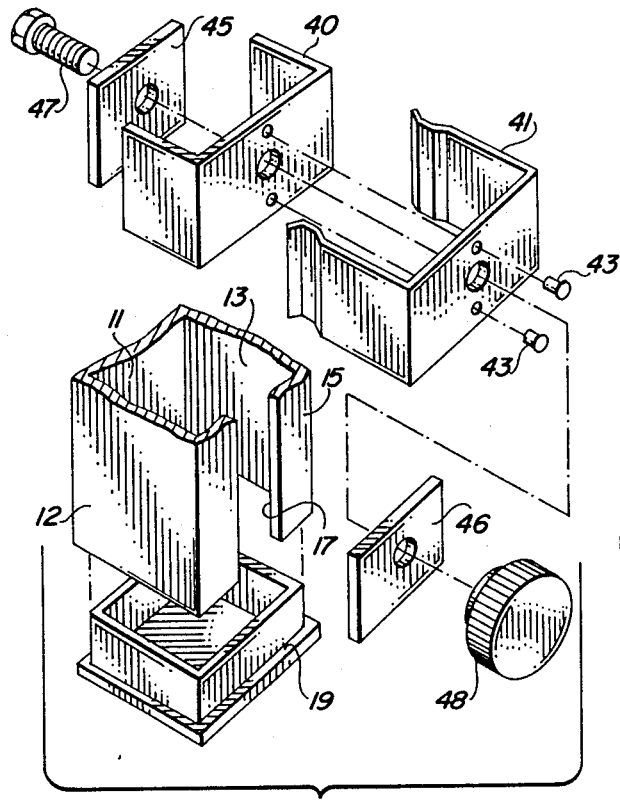
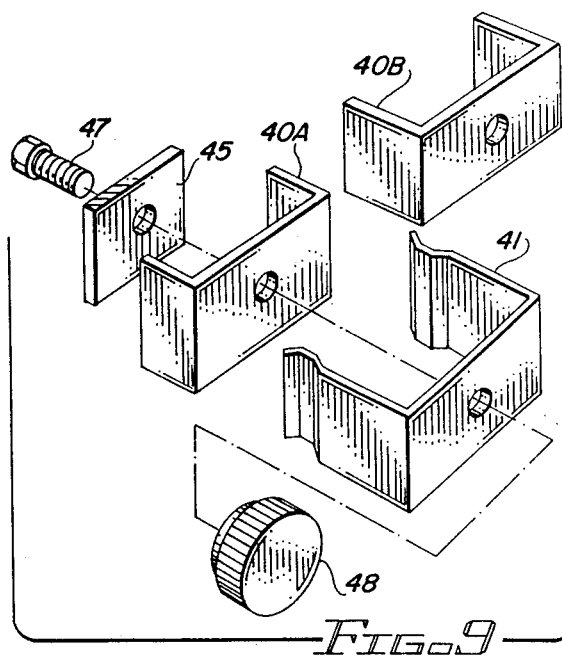

TOOL FOR POSITIONING ELECTRICAL OUTLET AND JUNCTION BOXES

BACKGROUND

During the construction of houses and commercial buildings, the basic building framework first is "roughed-in". This includes, in most cases, the erection of the wall structures in the form of wood or metal studs attached to floor plates and top plates to form the exterior and interior walls. After this stage of construction has been completed, electrical outlet boxes and junction boxes are attached to the studs; and the electrical wiring for the building is put in place either through conduit or in the form of insulated plastic sheathed wiring. All of this is done prior to the enclosure of the wall studs by the interior wall surfaces.

In the rough construction phases, the location of electrical boxes for outlets, wall switches and some junction boxes must be determined vertically from the floor. The boxes also must be mounted to extend outwardly from the front surface of the studs (such as two-by-four wood studs) a predetermined amount established by the thickness of the finished wall materials which are to be placed over the studs after the electrical boxes are attached and the necessary wiring has been completed.

To accomplish this, two measurements must be made each time an electrical outlet box is to be attached to a vertical stud. First, the vertical distance from the floor must be determined (and this distance is different for wall outlet boxes and switch outlet boxes). Then the amount by which the box is to extend beyond the front surface of the stud also must be established. Once these measurements have been made, the outlet box is nailed in place.

Typically, the studs to which outlet boxes and switch boxes are to be attached first are marked. The electrician then either independently measures the vertical height for locating the various boxes or utilizes a precut measuring stick on which the different box heights for the building under construction are marked. A mark is placed on the stud parallel with either the top or the bottom of the outlet box. After the measurements have been effected, the box is nailed in place. While this technique usually provides a relatively accurate vertical location of the outlet box on the stud, the amount that the box extends beyond the edge of the stud usually is not separately measured, but is approximated by the electrician when the box is nailed in place. Consequently, in some situations the box is recessed too far and in others, it extends beyond the finished wall of the completed construction.

It is readily apparent from a consideration of the foregoing that the measurement and placement of electric boxes for attachment to the wall studs, in the manner described, is a relatively time consuming, multiple step process. This process also inherently is subject to inaccuracies or improperly mounted boxes.

In the past, a variety of different devices have been devised for assisting in the mounting of electrical boxes on studs of a building under construction. Some such mounting devices have a flange or projection on them for inherently providing the proper amount of projection of the box past the stud, so that it is flush with the finished wall in the final construction. These devices, however, do not provide any assistance in proper vertical location along the length of the stud. In addition, the positioning device remains permanently in place and forms an integral part of the mounting of the box itself. Consequently, electrical boxes which incorporate these locating aids necessarily are more expensive than the basic hollow rectangular boxes used in most construction. Since large numbers of electrical boxes necessarily are used in any construction project, even a small additional cost per box frequently results in a prohibitably high expense, so that the mounting aid/box combinations generally are not economically practical.

Other devices have been developed for assisting in the locating and mounting of an electrical outlet box in the space between adjacent wall studs. These are specialty devices and are used only in situations where a precise location of a box, irrespective of the stud location, is required.

A U.S. Patent to Mangin, No. 1,774,934 discloses a device to assist in determining the vertical height of mounting of an electrical box above the floor. The device shown in this patent is a mounting aid attached to the box and which also has a portion mounted on the base plate of the wall. The device, however, of the Mangin Patent is a permanent part of the mounting for the box, and it is left in place once the box is mounted. It is not a separate reuseable tool for locating the box, but necessarily forms an integral part of the box and its mounting. Consequently, a relatively expensive junction box and its associated mounting results. This makes the device of the Mangin Patent impractical for most construction projects.

It is desirable to provide an electrical box locating tool which quickly and accurately facilitates both the vertical location of an electrical box on a stud and the amount by which the box projects from the face of the stud. It is desirable that such a tool is easy to use, relatively inexpensive, and capable of releaseably locating and holding electrical boxes of a standard design in position adjacent a stud for attachment to the stud, whereupon the tool quickly and easily may be removed for subsequent use with additional boxes to be mounted on other studs in the building under construction.

SUMMARY OF THE INVENTION

Accordingly, it is an object of this invention to provide an improved tool for use by electricians.

It is another object of this invention to provide an improved tool for assisting in the locating and mounting of electrical outlet and junction boxes on vertical studs.

It is an additional object of this invention to provide a tool for releaseably holding electrical outlet boxes in a proper vertical position and depth to facilitate the attachment of such outlet box to a wall stud during construction.

It is a further object of this invention to provide a tool for releaseably holding and locating electrical outlet and junction boxes in place for attachment to a wall stud during construction, whereupon such tool is pulled away from a box, after attachment of the box to the stud, for subsequent use in attaching further boxes.

In accordance with a preferred embodiment of the invention, a tool for facilitating the height and depth placement of electrical outlet and junction boxes on upright studs includes an elongated support member having top and bottom ends. The rear surface of the support member is made to engage with the surface of an upright stud to which an electrical box is to be attached. The support member has at least one box locator device releaseably attached to it and this releaseable attachment is capable of locating the box locator device at selected positions intermediate the top and bottom ends of the support member. The box locator device has a holding device on it for releaseably holding an electrical box at a predetermined depth from the rear surface of the support member and at a height which is established by the height of the box locator device on the support member, so that the box then may be attached to the stud after it has been positioned and located by the tool.

BRIEF DESCRIPTION OF THE DRAWINGS

FIG. 1 is a front perspective view of a preferred embodiment of the invention;

FIG. 2 is a front view of the invention, showing the manner in which it is used;

FIGS. 3 and 4 are cross-sectional views taken along the line 3—3 of FIG. 2 and illustrating two alternative arrangements of a first embodiment of the invention;

FIG. 5 is a cross-sectional view taken along the line 5—5 of FIG. 3;

FIG. 6 is an exploded view of the embodiment of FIGS. 3 through 5;

FIGS. 7 and 8 are cross-sectional views along a line comparable to the line 3—3 of FIG. 2 illustrating two different arrangements of an alternative embodiment of the invention; and FIG. 9 is an exploded view of the embodiment shown in FIGS. 7 and 8.

DETAILED DESCRIPTION

Reference now should be made to the drawings in which the same reference numbers are used throughout the different figures to designate the same or similar components.

Reference first should be made to FIGS. 1 through 4. FIG. 1 is a perspective view of a preferred embodiment of the invention which comprises a main support member in the form of an aluminum tubular support member comprising a flat planar rear surface 11, a pair of side walls 12 and 13, and a front surface 15, which is parallel to the rear surface. The front surface has an elongated slot 17 extending from end to end through the support member. Since all cross-sections of the support member are the same, it typically may be made of extruded aluminum or extruded plastic, cut to length and then provided with bottom and top end caps 19 and 20. The caps are made of plastic and are attached to the top and bottom of the support member in any suitable manner.

In an actual tool, the tubular support member is aluminum and has external dimensions of one inch for each of the surfaces 11, 12, 13 and 15 and, the wall thicknesses is one-sixteenth inches. The slot 17 is centered in the front surface and is one-half inch wide. The support member itself is five (5) feet long. All of these dimensions are given for an embodiment of the invention which actually has been constructed; but they may be varied, if desired, depending upon the application with which the tool is used and the materials out of which the support member is made.

The support member is shown in FIGS. 1 and 2 as having three box locator devices 30 attached to it. These locator devices 30 are capable of movement to any desired position within the slot 17; and once that position has been determined, the devices 30 are secured in the slot to prevent further movement during use of the tool in any particular construction job. If a different vertical location of any of the locators 30 subsequently is needed, the locator 30 which is to be vertically moved is released and then moved upwardly or downwardly in the slot 17 to the new desired position. Once the new position has been attained, the locator is secured in this position for the duration of any work corresponding to the new selected position in the slot 17.

FIG. 2 illustrates the manner in which the overall tool is used to position electric outlet boxes 33 at any one of three different vertical locations along the right-hand side of a wooden or metal stud 22 of the type found in typical building construction. The stud 22 is one of many which extends vertically between a floor plate 23 and a top plate 26. The floor plate 23, in turn, rests on a floor surface 24. When the tool is used, the bottom cap 19 rests on the floor 24; and the rear surface 11 of the support member is placed against the outwardly facing surface of the stud 22. The electrical boxes 33 to be attached to the stud are releaseably held in the various locator devices 30 in the relative positions shown in FIG. 2.

The vertical height of the boxes 33 is established by the vertical adjustment, made in the manner described previously, of the particular locator devices 30. In addition, the front surface position (the open side) of the outlet boxes 33 also is established by the locators 30, so that once the boxes 33 are moved into place by placement of the tool as shown in FIG. 2, they may be nailed or otherwise attached to the stud 22 in any suitable conventional manner. Once this has been accomplished, the tool simply is pulled outwardly from the front face of the stud 22 and the boxes 33 remain in place. The tool then is ready for use in the installation of subsequent boxes at any one or more of the three vertical locations illustrated in FIG. 2.

FIGS. 3 through 6 illustrate a first preferred embodiment of the structure of the locator devices 30 illustrated in FIGS. 1 and 2. Reference first should be made to FIG. 6, which is an exploded view of the locator device illustrated in conjunction with a partially cutaway exploded view of the bottom of the support member. The locator device comprises a U-shaped depth locator spacer 40 (made of aluminum, steel, or plastic) having a front surface and two projections (one on each side of the front surface) which extend along the side the side walls 12 and 13 of the support member (as shown in FIGS. 7 and 8). A U-shaped spring 41 is attached to the spacer 40 by means of a pair of rivets 43 to form an integral substructure or component of the locator device.

As illustrated most clearly in FIGS. 3 and 4, the open ends of the spring 41 have outwardly turned cam surfaces on them and terminate in an inwardly directed clamping projection which extends just beyond the ends of the spacer 40 on each side of the support member. When the spacer 40 and spring 41 are placed over the front surface 15, a hole through the center of these parts is aligned with the center of the slot 17. A holding block 45 then is placed behind the slot 17 and a threaded bolt 47 passes through a hole in the center of the block 45 and the holes in the spacer 40 and spring 41 (located on the outside or opposite side of the slot 17) to further pass through a central opening in a second spacer block 46. A threaded knurled knob is turned onto the bolt 47 to clamp the entire assembly securely in place through pressure exerted on the plate 45 on one side and the inner flange of the knob 48 on the other side, as shown in FIG. 3. This firmly holds the locator device 30 in whatever vertical position it has been placed prior to the tightening of the knob 48. If relocation of any one of the three locator devices 30 to a different vertical position along the length of the slot 17 in the support member is desired, the knob 48 is loosened; and the selected locator device 30 is adjusted either upwardly or downwardly to the desired vertical location. It should be noted that the front surface 15 on opposite sides of the slot 17 may be provided with marking indicia to indicate the distance from the bottom end of the device at the cap 19 to the mark, so that a separate tape measure, folding ruler, or the like is not necessary to determine the measured vertical height of the top of an electrical box 33 from the floor 24 in any given installation.

To facilitate the proper location of an electrical box 33 by use of the tool, the open edge of the box 33 is pushed against the edge of the spacer 40 (which is made to have a thickness equal to or greater than the wall thickness of a typical electrical box 33) by forcing the edge of the box 33 between the cammed end of the spring 41 and the side surface 12 or 13 of the support member. This is shown in the top cross-sectional view of FIG. 3. The top of the box 33 (which has been cut away in FIG. 3) engages the upper edge of the spacer 40 and spring 41, as indicated most clearly in FIG. 2. Thus, the top edge of the electrical box 33 is properly vertically located with respect to the stud 22 on which it is to be mounted once the initial position of the locator 30 has been effected by the adjustment of the knob 48, in the manner described previously.

The distance between the outside of the rear surface 11 of the locator and the edge of the spacer 40 is selected to be equal to the finished wall thickness of the wall materials to be placed over the front or facing surfaces of the studs 22 in the wall during subsequent construction. Consequently, the spacer 40 accurately locates the forward edge of the electric boxes 33 without any further measurements or concern by the electrician during the installation. The box 33 simply is put in place on the desired locator device 30 of the tool. The tool is placed against the stud 22 in the manner shown in FIG. 3 (and it can be either the right-hand side, as shown, or the left-hand side, as is readily apparent). Once the box 33 is in place, it is either nailed to the stud or otherwise attached to the stud 22 in a conventional manner. The tool then is pulled away from the front face of the stud 22; and the spring 41 releases the edge of the box, since the force of the spring 41 is far less than the holding force of the nails or other fasteners used to hold the box 33 onto the stud 22.

The spacer 46 as shown in FIG. 3 is mounted on the outside of the spring 41, so that it essentially plays no part in the location of the ends of the spacer 40 for establishing the depth of the electrical box 33 with respect to the stud 22. This may be considered to be the minimum wall thickness position for the embodiment of the tool shown in FIGS. 3 through 6.

The spacer 46, however, is selected to have a thickness which is equal to the additional standard thickness of a thicker wall surface to be placed over the studs 22 for some construction. In such a case, the spacer 46 is placed on the inside of the spacer 40 (but on the outside of the slot 17) as shown in FIG. 4. The knurled knob 48 then is tightened in the same manner described previously to provide the proper vertical location of the locator device 30. With the spacer 46, however, in the position shown in FIG. 4, the ends of the electrical box spacer member 40 are a greater distance from the outside rear surface 11 of the support device; so that the forward edge of the electrical outlet box 33 extends a greater distance beyond the front surface of the stud 22. Consequently, the location of the spacer 46 is selected to be either in the position shown in FIG. 3 or the position shown in FIG. 4, depending upon the desired thickness of the finished wall which is applied to the studs 22 after the electrical boxes 33 are in place and after the electrical work has been completed.

If more than two different wall thicknesses are to be accommodated, multiple spacers 46 may be used in combination with one another to provide the different wall thicknesses. The spacers 46 may be stored on the outside of the spring 41, as shown in FIG. 3, when they are not needed to change the depth of the box spacer 40. The multiple spacers 46 then may be stacked together in the position shown for the spacer 46 in FIG. 4 for different thicknesses of finished wall. The manner in which this is accomplished is readily apparent. Typically, wall board which is attached to studs in most home and business construction is either one-half inches thick or five-eigths inches thick. Consequently, the spacer 46 has a thickness of ⅛ inch to switch from the version shown in FIG. 3 (for one-half inch wall board) to the arrangement shown in FIG. 4 (for a wall with five-eigths inch wall board).

FIGS. 7, 8 and 9 illustrate an alternative embodiment which is similar to the embodiment of FIGS. 2 through 6, except that the second spacer 46 is not employed. Instead, different U-shaped electrical box spacers 40A and 40B are employed for the different finished wall thickness to be accommodated in any given job. As a consequence, the spring 41 is not attached to or secured to the spacers, since a spacer 40A having relatively short legs is employed to provide maximum extension outward of the edge of the box 33 from the stud; and a second spacer 40B, having relatively long legs, is used to provide a minimum extension of the electrical box 33 beyond the front surface of the wall stud 22. Obviously, other spacers similar to the spacers 40A and 40B may be provided to accommodate any standard (or customized) wall thickness desired. In all other respects, the manner of assembly and adjustment of the embodiment of FIGS. 7 through 9 is the same as described previously in conjunction with the embodiment of FIGS. 2 through 6.

The tool which has been described is shown as having three box locator devices 30 on it (FIGS. 1 and 2). This provides for the lowest mounting of electrical outlets, wall switches (the top locator 30), and an intermediate location, if desired. Thus, once the initial measurements are made and the various locators 30 are placed in the proper vertical positions in the slot 17 on the front of the support member, no further measurements need to be made for locating and attaching any of the electrical outlet boxes 33 during construction. The top locator device 30 is used for attaching the wall switch boxes, for example, while the lowermost locator 30 is used to attach the wall plug outlet boxes. The various selected spacers (whether the embodiment of FIGS. 2 through 6 or the embodiment of FIGS. 7 through 9 is used) are established initially in accordance with the wall thickness which is to be placed over the studs 22 during the final stages of construction. Once the spacers have been selected for a given construction job, no further adjustment of the spacers needs to be made.

The boxes 33 are readily slipped into engagement with the locators 30 by sliding the edges of the boxes over the springs 41 and then pressing the top of each box down until the inside of the upper surface engages the upper edge of the spacers 40 and the springs 41. When a box 33 is thus located and is pressed firmly against the vertical edge of the spacer 40, the tool is placed against the stud 22 with the box 33 resting alongside the stud. The electrical box 33 then is attached in place, the tool is moved away, a new box 33 is attached, and the cycle is repeated. This substantially reduces the time required for an electrician to mount the electrical boxes 33 in the rough construction phase. The tool is easy to use, is light-weight (particularly when it is made of aluminum or plastic) and is easy to adjust at the beginning of each construction site application.

Various changes and modifications will occur to those skilled in the art without departing from the scope of the invention. For example, a rectangular tubular support member of the type which has been illustrated may be constructed in a manner differently from the one shown. Instead of the slot 17 extending fully from end to end, it may be an elongated slot formed in the front face of a device and terminating short of the ends. A different type of attachment other than the slot through the front face may be used to secure the locator devices to the support member. Cam mechanisms in place of the bolt and knob device may be employed without departing from the scope of the invention. In addition, different types of spacers and different clamping or spring arrangements may be used in place of the one which has been illustrated in conjunction with the preferred embodiments. Such changes are contemplated to come within the scope of the invention, so that the preferred embodiments which have been shown are to be considered as illustrative of the invention only and not as limiting.

We claim:

1. A tool for facilitating the height and depth placement of electrical outlet and junction boxes on upright studs during construction, said tool including in combination:
    an elongated support member with top and bottom ends, a front surface, and having rear surface means for engagement with the surface of an upright stud to which an electrical box is to be attached;
    at least one box locator device;
    means for releaseably attaching said one box locator device to said support member at selected positions intermediate the top and bottom ends of said support member; and
    holding means on said box locator device for temporarily releaseably holding an electrical box thereon at a predetermined depth from the rear surface of said support member, said intermediate selected positions of said box locator further serving to establish the height placement of such electrical box on said upright stud for attachment to such stud.

2. The combination according to claim 1 wherein said elongated support member comprises an elongated tubular support member having a rectangular cross-section.

3. The combination according to claim 2 wherein said elongated tubular support member has a flat planar rear surface and a parallel flat planar front surface interconnected with one another by first and second parallel planar side surfaces, said front surface having an elongated slot therethrough extending at least a substantial portion of the total length of said support member, with said means for releaseably attaching said box locator device to said support member operating to attach said box locator device in said slot.

4. The combination according to claim 3 wherein said elongated support member is fabricated to have equal cross-sections throughout the length thereof.

5. The combination according to claim 4 wherein said box locator device comprises a substantially U-shaped spacer having dimensions to fit across the front surface of said support member, having first and second legs extending substantially parallel along each side surface of said support member, and having a length less than the width of said first and second sides, the length of the legs of said spacer being selected to correspond to the depth to which an electrical box is to extend outwardly from the rear surface of said support member.

6. The combination according to claim 5 wherein said holding means on said box locator device for releaseably holding an electrical box thereon comprises spring means overlying said U-shaped spacer and adapted to press the edge of an electrical box between said spring means and a side of said elongated support member with sufficient force to temporarily hold such box in place on said support member.

7. The combination according to claim 6 wherein said spring means comprises a U-shaped spring means, the ends of which are biased into engagement with the sides of said support member, and the ends of which further comprise cam surfaces for facilitating the sliding of the edge of an electrical box between such ends and the sides of said support member.

8. The combination according to claim 7 wherein said means for releaseably attaching said box locator device comprises clamping means for engaging the front surface of said elongated support member in said slot, whereby said box locator device may be located in any desired position along the length of said slot.

9. The combination according to claim 8 wherein said U-shaped spring member and said U-shaped spacer are interconnected together as a subassembly, and a second spacer is removeably placed between said subassembly and the front surface of said support member to cause said predetermined depth to be a first predetermined depth when said second spacer is so placed, and with said second spacer removed to cause said predetermined depth to be a second predetermined depth.

10. The combination according to claim 8 further including moveable spacer means capable of positioning in at least two different positions and cooperating with said means for releaseably attaching said box locator device to said support member for varying the distance between the end of the legs of said U-shaped spacer member and the rear surface of said support member to thereby vary the predetermined depth from the rear surface of said support member such electrical boxes extend outwardly therefrom.

11. The combination according to claim 8 wherein interchangeable U-shaped spacers having legs of different lengths are used to establish different predetermined depths for releaseably holding said electrical box.

12. The combination according to claim 1 further including a plurality of box locator devices, each having separate means for releaseably attaching such box locator devices to said support member at selected positions intermediate the top and bottom ends thereof, with each of said plurality of box locator devices having separate holding means thereon for temporarily releaseably holding electrical boxes thereon at said predetermined depth, the position of each of said plurality of box locator devices on said support member functioning to establish different heights for placement of electrical boxes on upright studs.

13. The combination according to claim 12 wherein said elongated support member comprises an elongated tubular support member having a rectangular cross-section.

14. The combination according to claim 13 wherein said elongated tubular support member has a flat planar rear surface and a parallel flat planar front surface interconnected with one another by first and second parallel planar side surfaces, said front surface having an elongated slot therethrough extending at least a substantial portion of the total length of said support member, with said means for releaseably attaching said box locator devices to said support member operating to attach said box locator devices in said slot.

15. The combination according to claim 14 wherein said means for releaseably attaching said box locator devices comprises clamping means for engaging the front surface of said elongated support member in said slot, whereby said box locator devices may be located in any desired position along the length of said slot.

16. The combination according to claim 1 wherein said elongated support member is fabricated to have equal cross-sections throughout the length thereof.

17. The combination according to claim 1 wherein said box locator device comprises a substantially U-shaped spacer having dimensions to fit across the front surface of said support member, having first and second legs extending substantially parallel along each side surface of said support member, and having a length less than the width of said first and second sides, the length of the legs of said spacer being selected to correspond to the depth to which an electrical box is to extend outwardly from said rear surface means of said support member.

18. The combination according to claim 17 further including moveable spacer means capable of positioning in at least two different positions and cooperating with said means for releaseably attaching said box locator device to said support member for varying the distance between the end of the legs of said U-shaped spacer member and said rear surface means of said support member to thereby vary the predetermined depth from said rear surface means of said support member such electrical boxes extend outwardly therefrom.

19. The combination according to claim 17 wherein interchangeable U-shaped spacers having legs of different lengths are used to establish different predetermined depths for releaseably holding said electrical box.

20. The combination according to claim 17 wherein said holding means on said box locator device for releaseably holding an electrical box thereon comprises spring means overlying said U-shaped spacer and adapted to press the edge of an electrical box between said spring means and a side of said elongated support member with sufficient force to temporarily hold such box in place on said support member.

* * * * *